United States Patent [19]
White, III et al.

[11] Patent Number: 6,092,617
[45] Date of Patent: Jul. 25, 2000

[54] SYSTEM FOR AUTOMATICALLY SLOWING VEHICLE DURING TURNS

[75] Inventors: Donald M. White, III, Chanhassen; Glenn L. Larsen, Bloomington; David A. Murray, Eagan; Gerald J. Zien, Prior Lake, all of Minn.

[73] Assignee: The Toro Company, Minneapolis, Minn.

[21] Appl. No.: 09/024,172

[22] Filed: Feb. 17, 1998

[51] Int. Cl.⁷ .................................................. B60K 17/00
[52] U.S. Cl. ............................................................ 180/338
[58] Field of Search ................................. 180/338, 305, 180/307, 308

[56] References Cited

U.S. PATENT DOCUMENTS

| | | |
|---|---|---|
| 4,354,420 | 10/1982 | Bianchetta . |
| 4,572,310 | 2/1986 | Peter . |
| 4,620,575 | 11/1986 | Cuba et al. . |
| 5,042,238 | 8/1991 | White, III et al. . |
| 5,168,970 | 12/1992 | Hough et al. . |
| 5,850,886 | 12/1998 | Kouo et al. ............................ 180/6.24 |

OTHER PUBLICATIONS

Ferris CTR Mower Parts List and Owner/Operator Manual, Jan. 1995.

Primary Examiner—Brian L. Johnson
Assistant Examiner—Faye M. Fleming
Attorney, Agent, or Firm—James W. Miller

[57] ABSTRACT

A slow in turn system for a vehicle comprises an accelerator linkage that is linked to the input lever of a variable speed transmission. The accelerator linkage includes first and second link arms that couple a foot pedal to a rotatable cam plate. The link arm that connects to the cam plate is coupled thereto by a slider so that the connection point of that link arm may be moved towards and away from the pivot axis of the cam plate. The slider is moved away from the pivot axis of the cam plate during turns of the vehicle to reversely rotate the cam plate, and hence retard the input lever of the speed changing system, to thereby automatically slow the vehicle. This movement of the slider is accomplished by a connecting linkage extending to the steering system of the vehicle. In addition, the vehicle includes a cruise control system that can be set to obtain a particular forward speed but which allows the operator to temporarily speed up without subsequently having to reset the cruise control system. The slow in turn system works without affecting the position of the accelerator foot pedal and without requiring the cruise control system to be disengaged.

19 Claims, 8 Drawing Sheets

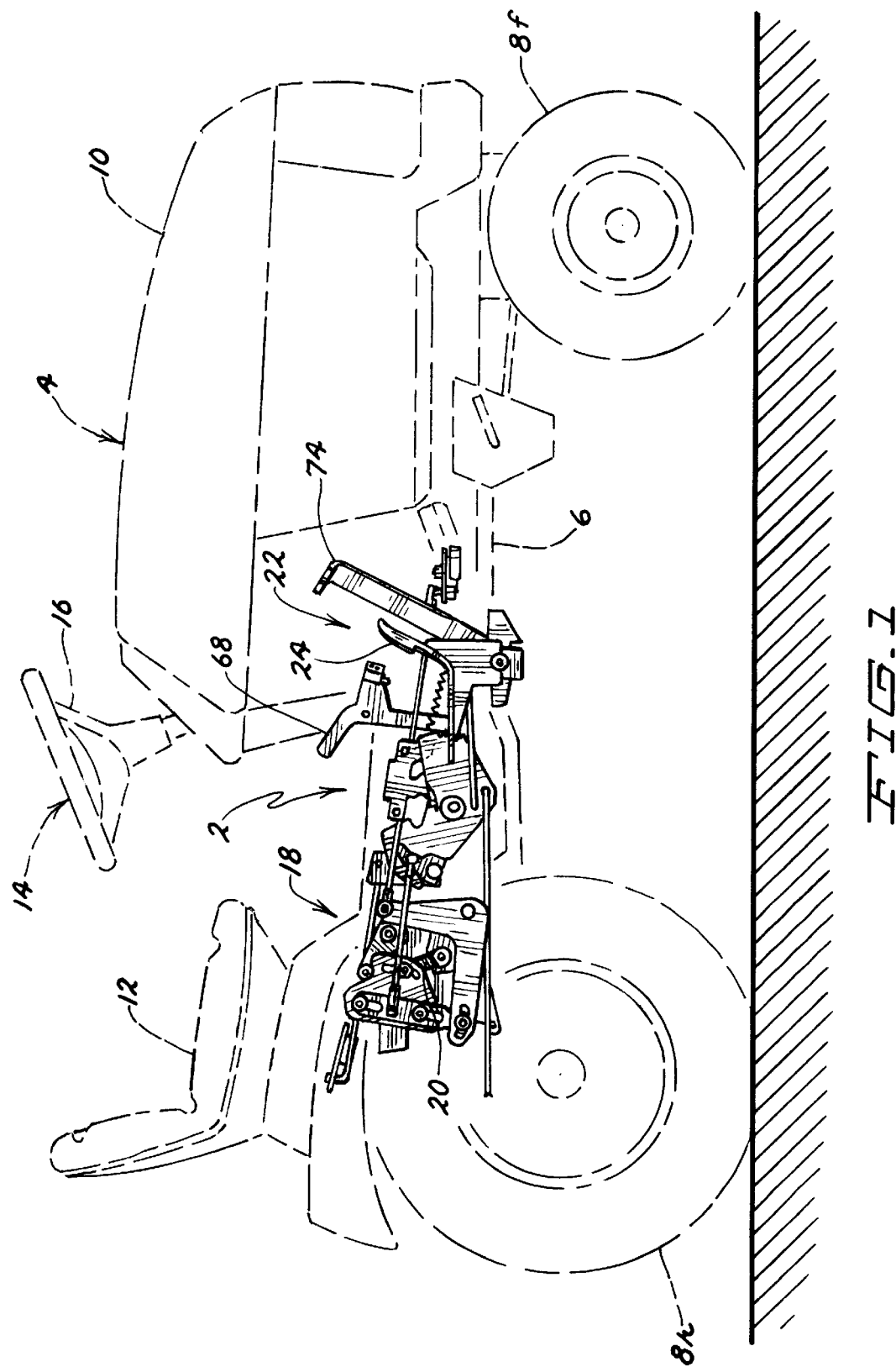

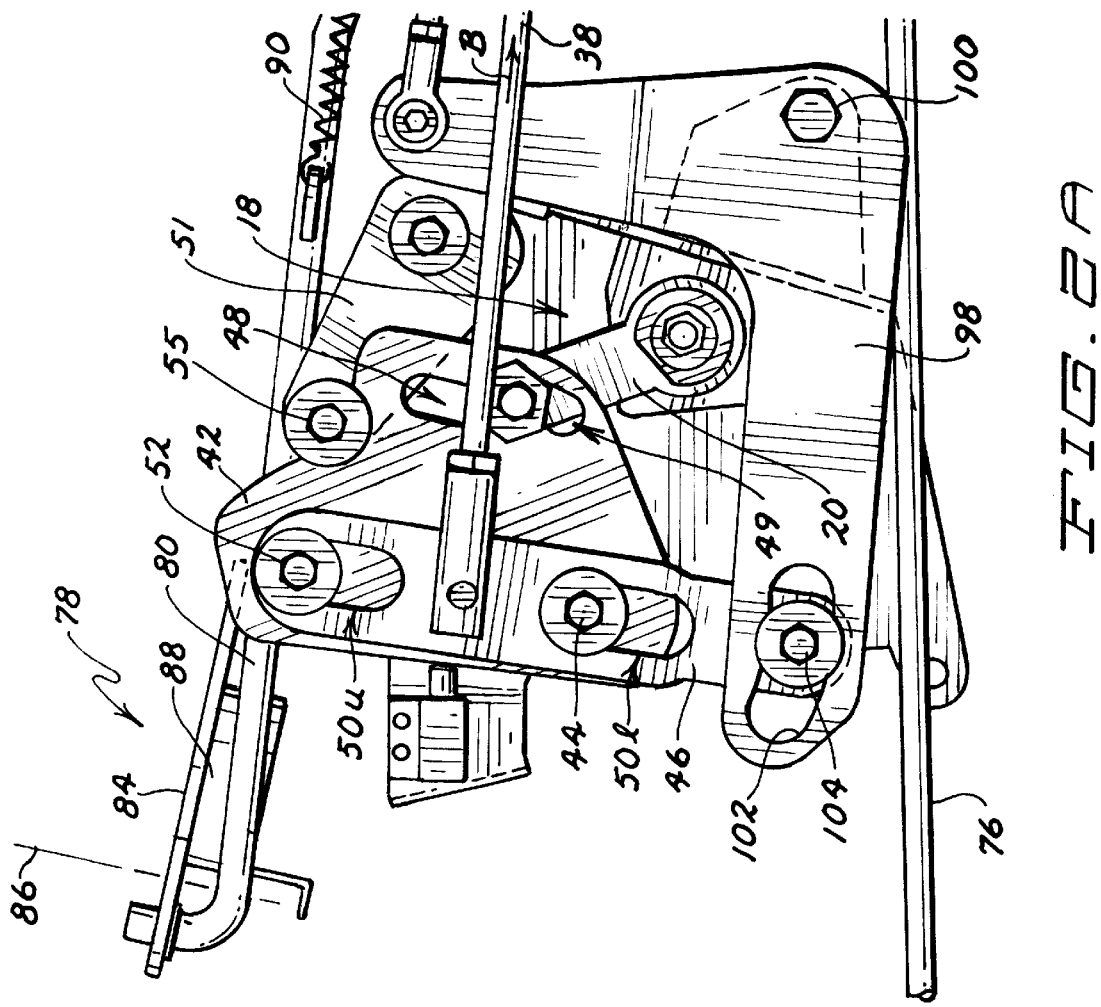
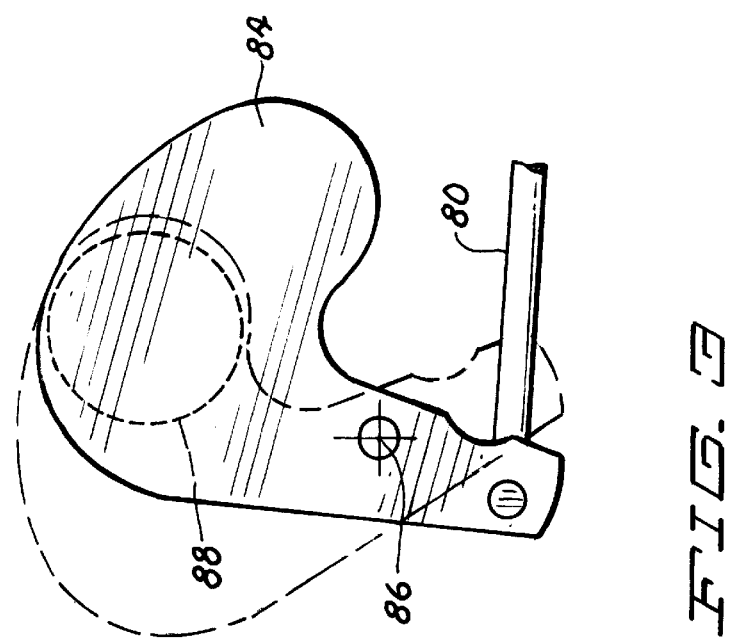

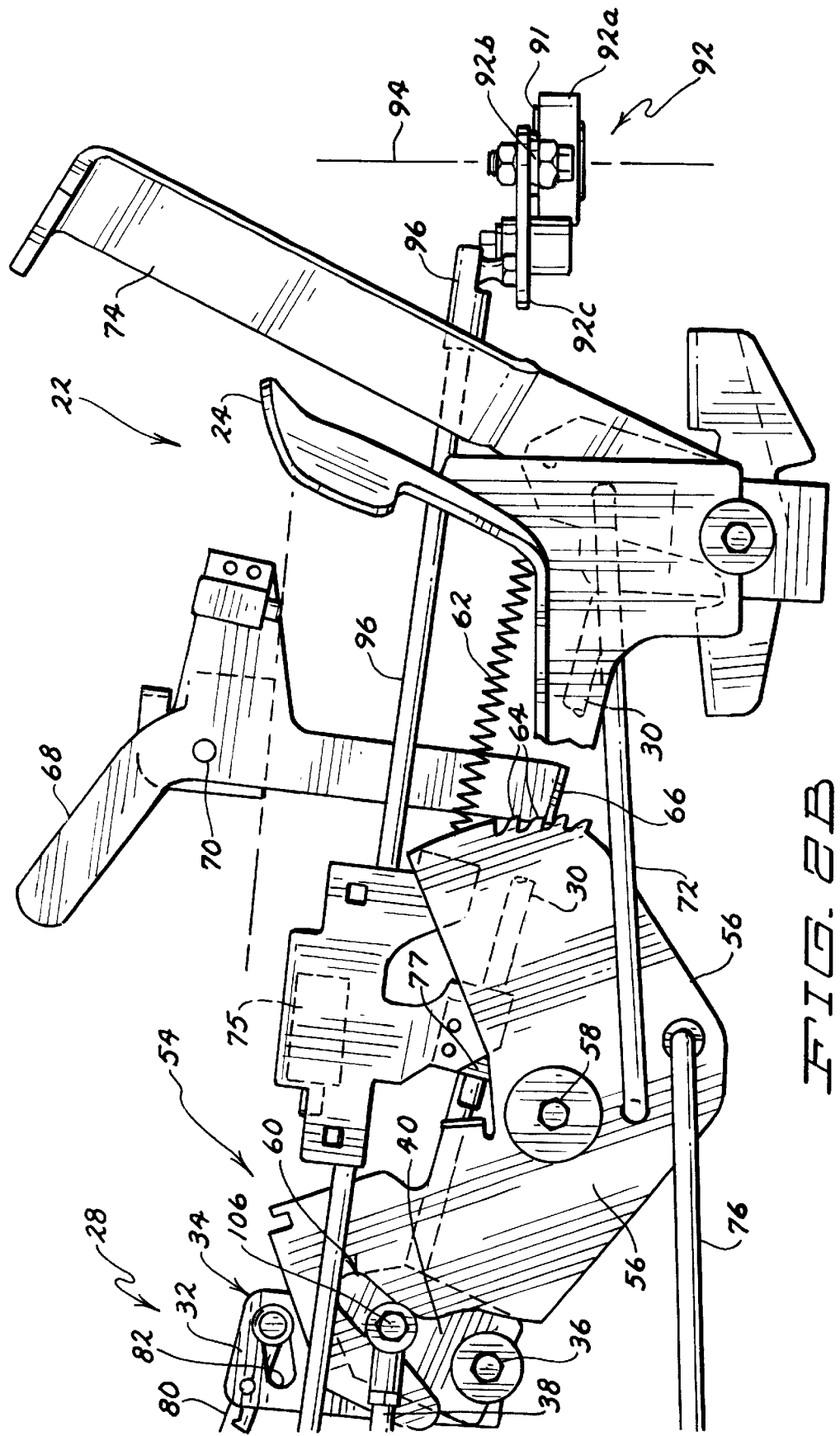

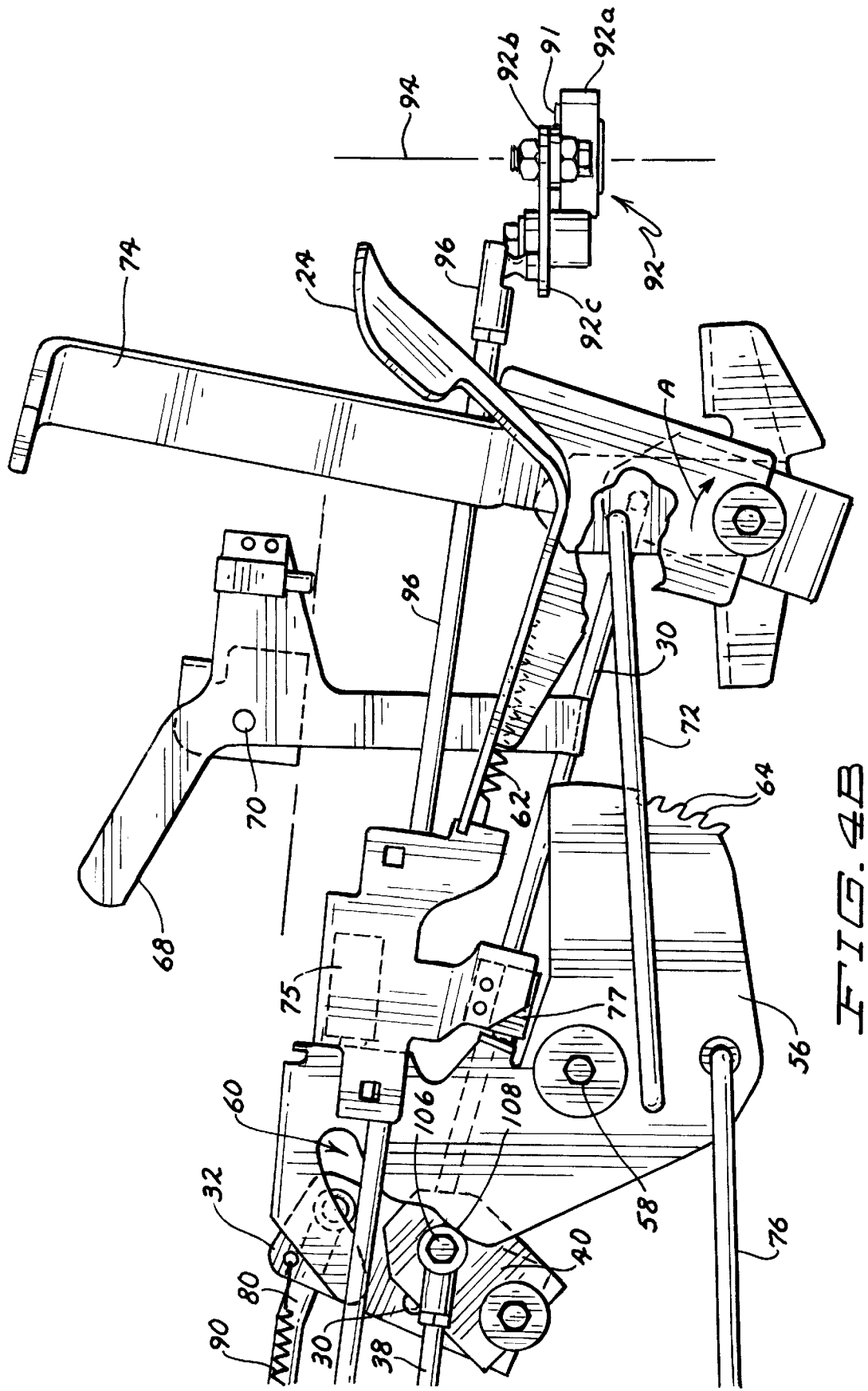

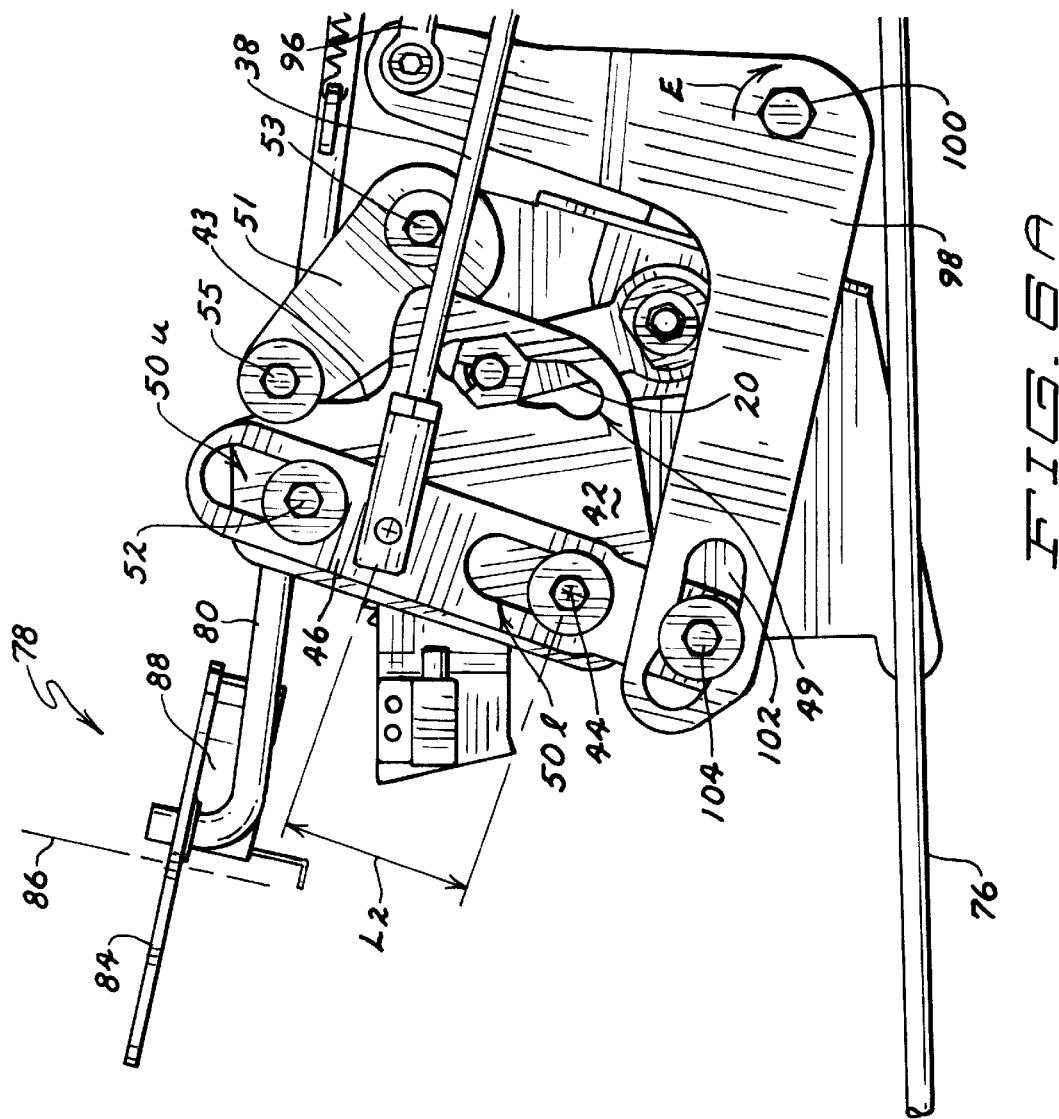
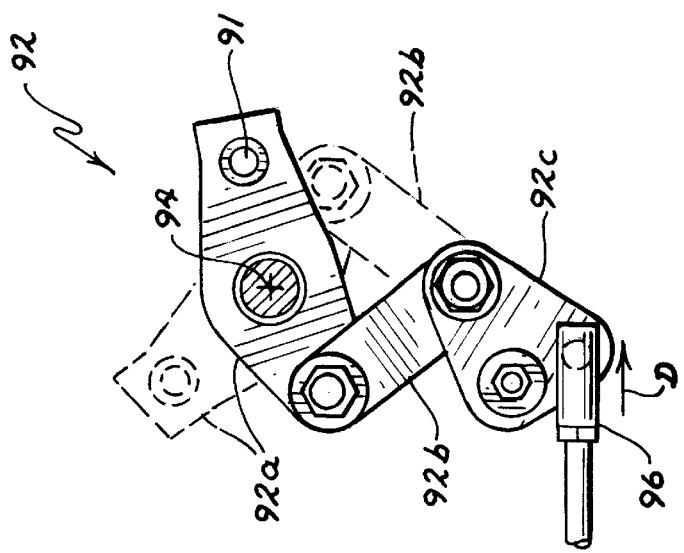

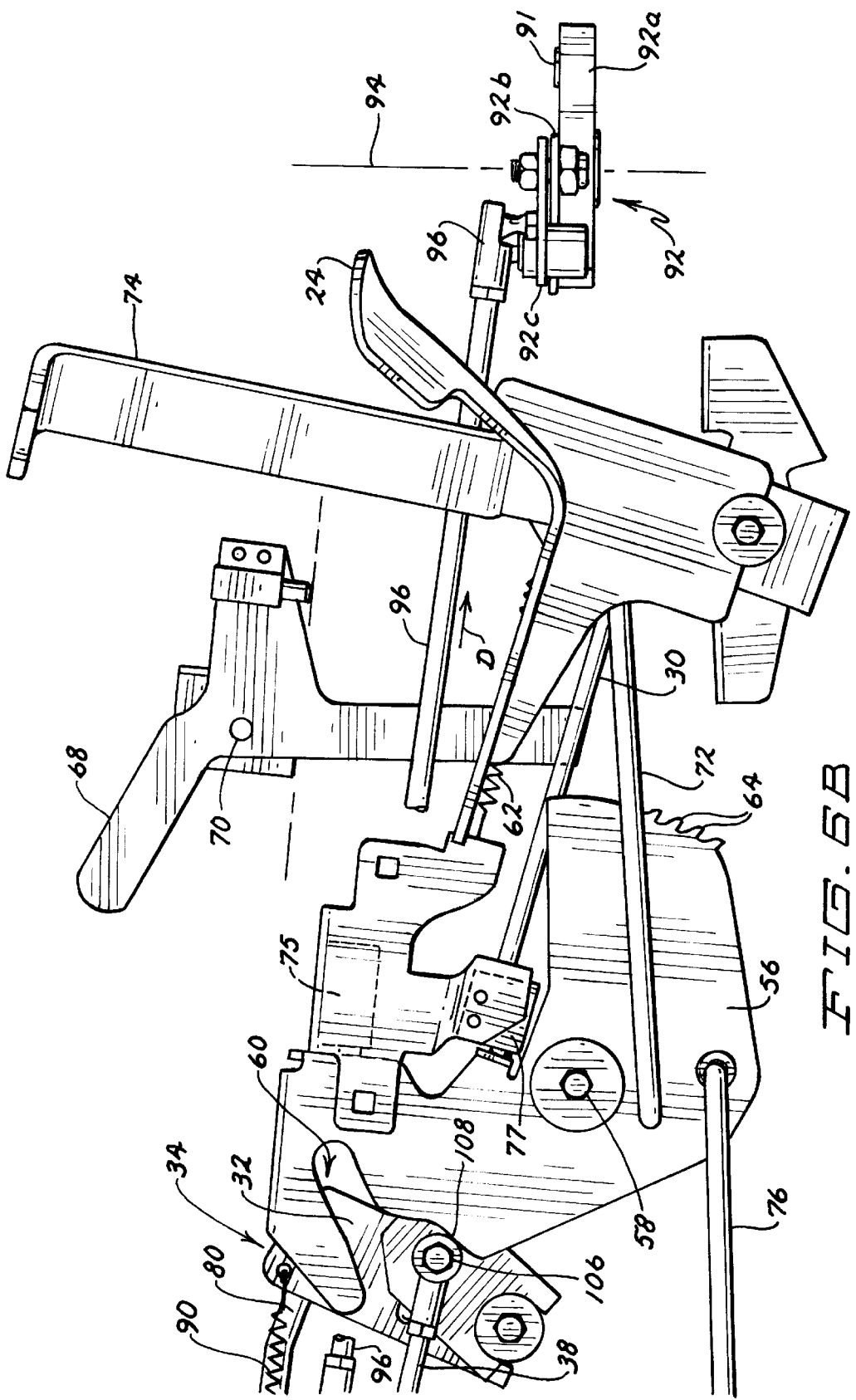

SYSTEM FOR AUTOMATICALLY SLOWING VEHICLE DURING TURNS

TECHNICAL FIELD

This invention relates to a vehicle, such as a small tractor or riding lawn mower, which frequently turns during operation. More particularly, this invention relates to a system for automatically slowing the vehicle during turns and to a novel linkage that forms part of this system.

BACKGROUND OF THE INVENTION

Lawn and garden tractors, riding lawn mowers, and the like are vehicles that carry a seated operator. These vehicles turn fairly sharply and frequently as they operate. For example, when mowing around trees or bushes, it is common for such vehicles to be almost constantly in some turn as the operator swings the vehicle around one tree or bush after another.

This type of vehicle has been equipped in the past with a system that automatically slows the vehicle during turns. One known system of this type uses a rotatable cam that is adjacent some portion of the accelerator linkage. When the operator initiates a turn by turning the steering wheel, the cam rotates to force the accelerator linkage back towards its neutral position. This causes the vehicle to slow.

U.S. Pat. No. 4,572,310 illustrates such a slow in turn system.

While this system is effective in slowing a vehicle during a turn, it has its own problems. To slow the vehicle down, this system forces back the accelerator linkage, and hence the accelerator pedal, from the position set by the operator. This can be disconcerting and distracting to the operator of the vehicle who is not used to feeling the accelerator pedal come back during operation of the vehicle. The natural inclination of the operator is to push back against the accelerator pedal with more force, thereby potentially defeating the purpose of the slow in the turn system. At the very least, the back pressure felt by the operator against his or her foot during operation of the slow in turn system is an annoyance and distraction to the operator.

SUMMARY OF THE INVENTION

It is one aspect of this invention to provide a vehicle having a slow in turn system that cannot be felt by the operator through reverse motion of the accelerator. This aspect is achieved in a vehicle which comprises a movable frame on which an operator may be carried. A steering system changes the direction of movement of the frame to thereby turn the frame. A speed changing system changes the speed of movement of the frame. An accelerator is operatively linked to the speed changing system which accelerator can be engaged and moved by the operator to set a desired speed of movement of the frame. Finally, a means is provided for slowing the frame during at least some turns of the frame without affecting the position of the accelerator.

Another aspect of this invention is to provide a linkage producing varying amounts of rotation in a rotatable member for a given amount of longitudinal movement of a link arm. The linkage comprises a rotatable member that pivots about an axis. A link arm has one end that is connected to the rotatable member at a position offset from the axis so that a longitudinal movement of the link arm produces rotation of the rotatable member. A means is provided for moving the one end of the link arm towards or away from the pivot axis to thereby produce different amounts of rotation of the rotatable member for the same amount of longitudinal movement of the link arm.

BRIEF DESCRIPTION OF THE DRAWINGS

This invention will be described more completely in the following Detailed Description, when taken in conjunction with the following drawings, in which like reference numerals refer to like elements throughout.

FIG. 1 is a side elevational view of a vehicle comprising a lawn and garden tractor having the slow in turn system of this invention shown in solid lines with the remainder of the vehicle being shown in phantom;

FIG. 2 is a side elevational view of the slow in turn system of FIG. 1, showing the system in a neutral condition with the vehicle at rest and the vehicle brakes applied, with FIG. 2 being split into two halves labelled FIGS. 2A and 2B with such halves being placed on separate sheets to allow the components of the system to be shown more clearly;

FIG. 3 is a top plan view of a portion of a cruise control system that is operatively linked to the slow in turn system of FIG. 1;

FIG. 6 is a side elevational view of the slow in turn system of FIG. 1, showing the system in a drive condition with the vehicle turning at a reduced forward speed, with FIG. 6 being split into two halves labelled FIGS. 6A and 6B with such halves being placed on separate sheets to allow the components of the system to be shown more clearly;

FIG. 7 is a top plan view of the steering linkage when the vehicle is turning;

DETAILED DESCRIPTION

Figure 4A:
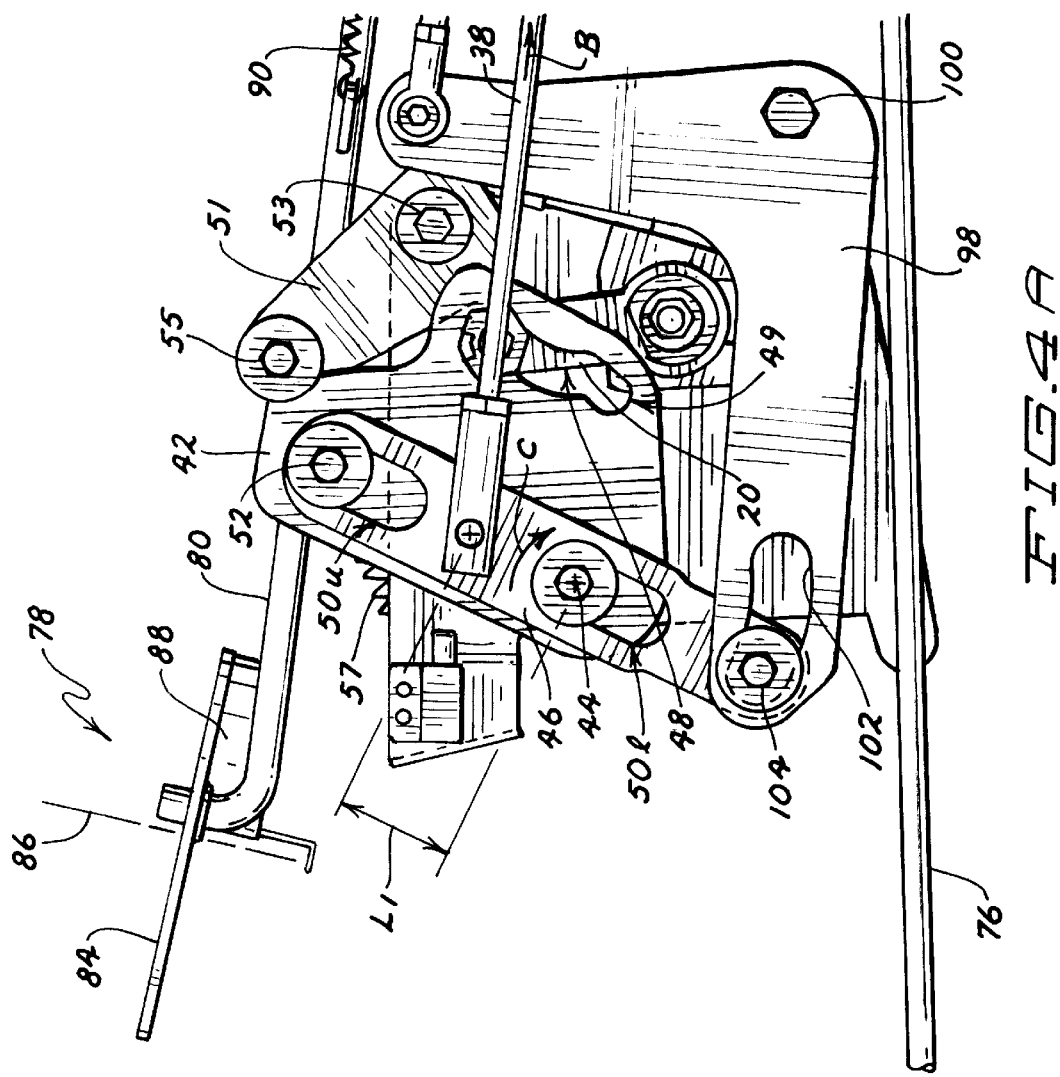
FIG. 4 is a side elevational view of the slow in turn system of FIG. 1, showing the system in a drive condition with the vehicle travelling straight at full forward speed, with FIG. 4 being split into two halves labelled FIGS. 4A and 4B with such halves being placed on separate sheets to allow the components of the system to be shown more clearly.

One aspect of this invention comprises a system, generally identified as 2 in FIG. 1, for automatically slowing a vehicle 4 as vehicle 4 turns. Vehicle 4 in FIG. 1 comprises a lawn and garden tractor having a frame 6 that is supported by a plurality of wheels 8 for movement over the ground. An internal combustion engine or other power source (not shown) is carried on frame 6 beneath a cowl or hood 10. The engine powers at least certain wheels 8 so that vehicle 4 is self-propelled. An operator sits on a seat 12 carried on frame 6 to drive vehicle 4.

Vehicle 4 includes a system 14 for steering vehicle 4 to allow the operator to control its direction of movement. Steering system 14 includes a steering wheel 16, positioned adjacent the operator's seat 12, which the operator can grip as he operates vehicle 4. Turning steering wheel 16 to the left or right will cause vehicle 4 to turn to the left or right because steering wheel 16 is operatively linked to one or more steerable wheel(s) 8 on frame 6. Turning steering wheel 16 rotates the steerable wheel(s) 8 about a substantially vertical axis to turn vehicle 4 out of a straight line path of movement.

The type of vehicle shown in FIG. 1, namely a lawn and garden tractor, typically has four ground engaging wheels 8 with the two front wheels 8f being steerable and the two rear wheels 8r being non-steerable traction or drive wheels. However, vehicle 4 could comprise a greensmower having a tricycle, three wheel configuration with two traction or drive wheels 8 on one end and a single steerable wheel 8 on the other end. Often, the single steerable wheel 8 in this three wheel configuration is on the rear end of vehicle 4 beneath the operator's seat 12. Thus, the precise wheel configuration of vehicle 4, including which wheel(s) 8 are steerable and which are driven, is not important to this invention. Vehicle 4 must simply have some type of steering system 14 that turns vehicle 4 when steering wheel 16 is turned by the operator.

In addition to steering system 14, vehicle 4 also includes a speed changing system 18 that varies the speed of vehicle 4 in accordance with the wishes of the operator. Again, the precise nature of speed changing system 18 is not important to this invention. For example, speed changing system 18 could comprise a system that increases or decreases the speed of the engine to vary the vehicle speed. Alternatively and preferably, however, speed changing system 18 comprises some type of variable speed transmission that allows vehicle 4 to travel at different speeds without affecting the engine speed, i.e. the engine can operate at a constant speed. In the case of vehicle 4 shown in FIG. 1, a variable speed transmission is preferably used which infinitely varies the vehicle speed as an input lever 20 on the transmission is rotated.

Vehicle 4 includes an accelerator 22 that is selectively moved by the operator to adjust the speed of vehicle 4. Typically, and as shown in vehicle 4, accelerator 22 comprises a treadle type foot pedal 24 that is depressed by the foot of the operator. When the operator depresses the top of foot pedal 24 with the toes of his foot, vehicle 4 accelerates forwardly. If the operator depresses the rear or bottom of foot pedal 24 with the heel or toes of his foot, vehicle 4 accelerates rearwardly. Foot pedal 24 has a neutral position, which corresponds to a neutral position of input lever 20 on the variable speed transmission, in which vehicle 4 is stationary, i.e. vehicle 4 is not being driven either forwardly or rearwardly.

The treadle type of foot pedal 24 in which the operator uses either the toes or heel of his foot to depress one end or the other of the pedal to select forward or reverse is well known in lawn and garden tractors and similar vehicles and need not be described further herein. However, foot pedal 24 need not be a treadle type and could comprise a pedal 24 which is depressed only in one direction using the toes of one's foot. In this case, forward or reverse would be selected by some other control, such as a hand operated lever (not shown), that the operator would set to engage the transmission in a forward or reverse direction. Moreover, accelerator 22 could be something other than a foot pedal 24 and could comprise a hand operated control if so desired. Thus, the precise types of speed changing system 18 and accelerator 22 that are used on vehicle 4 could obviously be varied.

This invention relates to a novel and unique system 2 for automatically slowing vehicle 4 during turns. As such, this invention is most useful for a vehicle 4, such as the lawn and garden tractor that is shown in the drawings, that frequently turns. The slowing provided by the system 2 of this invention prevents scuffing of the turf and helps the operator to trim around bushes and trees. The system 2 of this invention provides slowing in both forward and reverse directions.

In addition, the system 2 of this invention works in conjunction with a cruise control system such that the automatic slowing provided by system 2 does not trip out or disengage the cruise control system. Thus, operator productivity is enhanced. The operator does not have to continually reset the cruise control system after the slowing effected during a turn has been completed and the vehicle speeds back up when resuming straight line travel.

Besides lawn and garden tractors, other outdoor maintenance vehicles have the same operational characteristics and might also profitably use slow in turn system 2 of this invention. Such other vehicles 4 include small riding mowers of the type used to cut a homeowner's yard, larger riding greensmowers or fairway mowers of the types used to cut the greens or fairways of golf courses, riding sand trap maintenance machines used to groom the sand traps of golf courses, and small utility vehicles used to transport personnel and equipment. Besides these vehicles 4, however, slow in turn system 2 could be used on any vehicle 4 of any type in which vehicle 4 is desirably slowed as vehicle 4 turns. Thus, the term "vehicle" is not meant to be limiting as to the type of vehicle involved as this invention has wide application to vehicles generally, though many vehicles with which it is most naturally used comprise outdoor maintenance vehicles.

Referring now to FIG. 2, slow in turn system 2 of this invention will be described in conjunction with sufficient other components of vehicle 4 to illustrate the structure and function of system 2.

Foot pedal 24 pivots about an accelerator pivot axis 26 on frame 6. In FIG. 2B, foot pedal 24 is shown in its neutral position in which vehicle 4 is at rest. In this position, the operator has not depressed foot pedal 24 with his foot and the vehicle's brakes (both the service and parking brakes) are applied. FIG. 4B illustrates foot pedal 24 having been depressed by the toes of the operator's foot to drive vehicle 4 forwardly. Thus, referring to FIG. 4B and comparing it to FIG. 2B, foot pedal 24 has been rotated about accelerator pivot axis 26 in a clockwise direction indicated by the arrow A.

An accelerator linkage 28 couples foot pedal 24 to input lever 20 of speed changing system 18 so that rotation of foot pedal 24 also rotates input lever 20. Accelerator linkage 28 comprises the following components:

1.) a front accelerator link arm 30 extending between foot pedal 24 and a first intermediate link 32 in an intermediate link assembly 34 that is pivotal about an intermediate link assembly pivot axis 36 on frame 6;

2.) a rear accelerator link arm 38 extending between a second intermediate link 40 in intermediate link assembly 34 and a pivotal cam plate 42 that pivots about a cam plate a pivot axis 44, rear accelerator link arm 38 not being directly coupled to cam plate 42 but being attached to a vertically movable slide 46 carried on cam plate 42; and 3.) a cam slot 48 in one side of cam plate 42 away from slide 46 with cam slot 48 receiving one end of input lever 20 therein.

Slide 46 has two elongated slots 50 parallel to the length thereof with these slots 50 being set one above the other. The lower slot 50l receives the pin that forms cam plate pivot axis 44. The upper slot 50u receives an upper pin 52 extending between cam plate 42 and slide 46. This upper pin 52 forms a connection between slide 46 and cam plate 42 which rotates cam plate 42 when slide 46 rotates. For example, if slide 46 were to rotate in a clockwise direction about cam plate pivot axis 44, then the upper slot 50u in slide 46 would push against the upper pin 52 to also conjointly rotate cam plate 42 about cam plate pivot axis 44.

Accordingly, when the operator steps down on foot pedal 24 to drive vehicle 4 forwardly, the clockwise rotation of foot pedal 24 represented by the arrow A in FIG. 4B pulls on front accelerator link arm 30, which in turn rotates intermediate link assembly 34 about intermediate link assembly pivot axis 36, which in turn pulls on rear accelerator link arm 38. As rear accelerator link arm 38 is pulled forwardly in the direction of the arrow B in FIG. 4A, slide 46 is rotated clockwise about cam plate pivot axis 44 as represented by the arrow C in FIG. 4A. This in turn causes cam plate 42 to rotate clockwise because of the interaction between upper pin 52 on cam plate 42 and upper slot 50u. As cam plate 42 rotates in a clockwise direction, cam slot 48 on the other side of cam plate 42 will rotate input lever 20 on speed changing system 18 in a clockwise direction. The net result of all this is that rotation of foot pedal 24 in a clockwise or forward direction effects a clockwise or forward rotation of input lever 20 on speed changing system 18 to select a particular forward speed of movement for vehicle 4.

The degree of rotation of foot pedal 24 determines how fast vehicle 4 travels. The farther the operator pushes down on foot pedal 24, the farther cam plate 42 and input lever 20 on speed changing system 18 are rotated. Thus, FIG. 4 illustrates speed changing system 18 at its maximum forward speed with foot pedal 24 having been fully depressed in its forward direction and the end of input lever 20 having reached the top of cam slot 48. Pushing down on foot pedal 24 only partway would result in a forward speed set somewhere between zero and its maximum forward speed.

As can be seen from FIG. 2A, cam slot 48 also has a lower section 49 that extends below the end of input lever 20 when system 2 is in its neutral position. This lower section 49 of cam slot 48 is to accommodate movement of foot pedal 24 in its reverse direction, i.e. when the operator depresses the lower end of foot pedal 24 with the heel or toes of his foot to rotate foot pedal 24 in a counter-clockwise direction in FIG. 2B. When this happens, accelerator linkage 28 described above will rotate and move reversely to that described so as to rotate input lever 20 in a counter-clockwise direction to set a reverse speed. However, the orientation of the components of system 2 in reverse has not been illustrated in the drawings.

A return to neutral system sets foot pedal 24 and speed changing system 18 in their neutral orientation of FIG. 2 whenever the operator's foot is off foot pedal 24. This return to neutral system includes a pivotal, return to neutral lever 51 that rotates about a return to neutral pivot axis 53. The free end of the return to neutral lever 51 includes a pin or bushing 55 that rides against one side of cam plate 42. Bushing 55 rests in a notch 43 on cam plate 42 when the foot pedal 24 and speed changing system 18 are in their neutral positions. A spring 57 exerts a counter-clockwise torque on lever 51 tending to bias lever 51 in the direction required to seat bushing 55 in notch 43. See FIG. 6A. This type of return to neutral system comprising a pivotal, spring biased return to neutral lever is known in the art for setting a variable speed transmission in neutral.

Accelerator linkage 28 interacts with a brake system 54 that also sets foot pedal 24 and speed changing system 18 in their neutral orientation of FIG. 2 whenever the operator's foot is off foot pedal 24 and the vehicle's brakes have been applied. This brake system 54 includes a pivotal, brake bellcrank 56 that rotates about a brake pivot axis 58. Brake bellcrank 56 includes a slot 60 on its rear arm that engages against a post (not shown) on intermediate link assembly 34 which is connected to one end of rear link arm 38. Whenever foot pedal 24 is not depressed in either the forward or reverse directions and brake pedal 74 is depressed, slot 60 in the rear arm of brake bellcrank 56 forces accelerator linkage 28, and hence input lever 20 on speed changing system 18, into their neutral orientation of FIG. 2.

The front arm of brake bellcrank 56 is provided with a plurality of sawteeth 64. When brake pedal 74 is first depressed to actuate the vehicle's brakes and place brake bellcrank 56 in the position shown in FIG. 2, these sawteeth 64 are then in a position to cooperate with a lower locking edge 66 on a parking brake 68. As shown in FIG. 2, parking brake 68 can then be set such that its locking edge 66 is engaged with one of sawteeth 64. Accelerator linkage 28 is then locked to prevent inadvertent actuation of foot pedal 24. The operator must release parking brake 68, either by pivoting it about a parking brake pivot axis 70 to disengage parking brake 68 or by stepping on brake pedal 74 for the vehicle's service brakes which also releases parking brake 68, before vehicle 4 can be driven.

Brake bellcrank 56 is mechanically linked by a front brake link arm 72 to a brake pedal 74 that may be selectively operated to stop vehicle 4. A brake return spring 62 normally positions brake pedal and brake bellcrank 56 in their unactuated positions shown in FIG. 4B. A rear brake link arm 76 extends from brake bellcrank 56 to the braking system (not shown) of vehicle 4. As described above, whenever the operator engages his foot with the top of brake pedal 74 and pushes down on brake pedal 74, brake bellcrank 56 would also be rotated in the direction that would reset accelerator linkage 28 and input lever 20 on speed changing system 18 to neutral. This is a further safety feature which is often used in vehicles of this type. In other words, in other lawn and garden tractors known prior to this invention, stepping on the brake pedal often resets accelerator linkage 28 to neutral.

A cruise control system 78 is provided for temporarily locking accelerator linkage 28 in a selected position. Cruise control system 78 comprises a cruise control link arm 80 having one end received in a substantially horizontal slot 82 in the top of first link 32 of intermediate link assembly 34 in accelerator linkage 28. The other end of cruise control link arm 80 includes a horizontal locking plate 84 that pivots about a substantially vertical, cruise control pivot axis 86. An electromagnet 88 underlies plate 84.

A biasing spring 90 extends between cruise control link arm 80 and first link 32 of intermediate link assembly 34. This biasing spring 90 keeps cruise control link arm 80 forced up against the forward end of horizontal slot 82. As intermediate link assembly 34 pivots in a clockwise direction, spring 90 will be tensioned thus biasing cruise control link arm 80 forwardly in slot 82 as well to remain engaged with the forward end of slot 82.

After the operator has selected a desired speed of travel by depressing foot pedal 24 a desired amount, he can lock accelerator linkage 28 in place by pressing a cruise control set button (not shown) adjacent the operator's seat or on the vehicle's dash or in some other location convenient to the operator. When this is done, electromagnet 88 is energized to lock accelerator linkage 28 in a desired spot by attracting and holding horizontal locking plate 84 using an electromagnetic force. Thus, if the operator removes his foot from foot pedal 24 and cruise control system 78 is engaged, accelerator linkage 28 will stay in place as cruise control link arm 80 will prevent accelerator linkage 28 from returning to neutral.

In this cruise control system, depression of brake pedal 74 will be sensed by a sensor 75 and cruise control system 78 will automatically be disengaged by deenergizing electromagnet 88 to release cruise control link arm 80. Thus, tapping or stepping on the brakes will automatically release cruise control system 78. Another sensor 77 enables the operator to start the engine of vehicle 4 only when the speed changing system 18 is locked in its neutral position.

Horizontal slot 82 in cruise control system 78 is elongated to allow the operator to temporarily speed up from the current cruise control setting without having to subsequently reset cruise control system 78. The operator can depress foot pedal 24 and move accelerator linkage 28 to a position farther forward than the position at which accelerator linkage 28 is locked when foot pedal 24 is at less than its full speed position. This movement is allowed due to the elongation of horizontal slot 82. Once the temporary overspeeding condition is ended and the operator takes his foot off foot pedal 24, accelerator linkage 28 will reset to that position determined by cruise control system 78, i.e. where the forward end of horizontal slot 82 in first link 32 of intermediate link assembly 34 engages against the front end of cruise control link arm 80.

Elongated slot 82 also prevents the cruise control system from being effective during reverse motion of vehicle 4. During reverse motion, first link 32 will move rearwardly as required to obtain reverse motion with the front end of slot 82 pushing the cruise control link arm 80 rearwardly. If the cruise control system is then set to energize electromagnet 88, electromagnet 88 will attract and grab locking plate 84 to lock cruise control link arm 80 in place. However, if the operator were to release foot pedal 24 to end the reverse motion of vehicle 4, the locked cruise control link arm 80 does not prevent the accelerator linkage from resetting to neutral. The elongation in slot 82 allows first link 32 to move forwardly relative to the front end of cruise control link arm 80 as spring 90 is weaker than the spring acting on the return to neutral lever 51. Thus, the accelerator linkage will reset from a position for obtaining reverse motion of vehicle 4 to its neutral position even if the cruise control system has been engaged. Cruise control is simply not effective in reverse due to the elongation of slot 82.

The cruise control system embodied herein is electrically actuated, i.e. by energizing electromagnet 88, but still permits the operator to speed up when going in a forward direction while retaining the cruise control setting. The energization of electromagnet 88 locks cruise control link arm 80 in place, but the accelerator linkage is forwardly movable relative to link arm 80 due to elongation of slot 82. When the operator releases pedal 24, the accelerator linkage returns towards neutral until the front end of slot 82 reengages against the front of cruise control link arm 80. The electromagnet 88 remains continuously energized. Thus, the operator need not reset the cruise control link arm 80 each time he or she speeds up, which is a further productivity enhancement and eases the task of driving vehicle 4. In electromagnetic cruise control systems known in the prior art, the only way to obtain an increase in speed from an existing cruise control setting was to physically force the locking plate past the electromagnet to a new position, thus losing the existing cruise control setting in the process. Accordingly, the cruise control system disclosed herein has usefulness separate and apart from the slow in turn system 2.

The automatic slow in turn system 2 of this invention further includes a connecting linkage between steering system 14 of vehicle 4 and slide 46 that is part of accelerator linkage 28. More particularly, the use of the elongated slots 50 in slide 46 allows slide 46 to rise or lift upwardly relative to cam plate axis 44. This movement of slide 46 is accomplished as vehicle 4 turns. This movement of slide 46 effectively changes the geometry in accelerator linkage 28 to decrease the amount cam plate 42 rotates for a given elongation of accelerator linkage 28. Thus, as slide 46 rises, the amount of rotation of cam plate 42 decreases, and vehicle 4 automatically slows as it turns.

Figure 5:
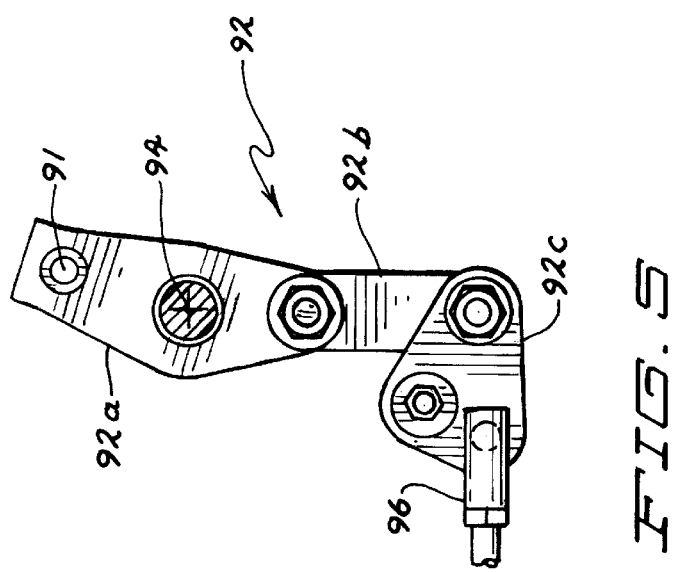
FIG. 5 is a top plan view of a steering linkage when the vehicle is travelling straight.

The connecting linkage to steering system 14 includes a set of horizontal connecting links 92a, 92b and 92c that are coupled to steering system 14. As the user rotates steering wheel 16, first connecting link 92a also rotates about a substantially vertical axis 94 to rotate the remaining links 92b and 92c. FIG. 5 shows the orientation of connecting links 92 when vehicle 4 is traveling straight ahead. FIG. 7 shows the orientation of connecting links 92 during a turn with the solid line illustration representing a left turn of vehicle 4 and the phantom line illustration representing a right turn of vehicle 4.

Any suitable connection may be made between steering system 14 and link 92a. For example, link 92a may be provided with an opening 91 for connecting to the arm of a power steering cylinder such that the cylinder arm rotates link 92a as it moves in response to movement of steering wheel 16 by the operator. Alternatively, link 92a may be rotated by a gear in a steering system not having a power steering cylinder which gear is rotated when the operator turns steering wheel 16. The exact connection between steering system 14 and link 92a is not important to this invention and, therefore, has not been specifically illustrated herein.

Connecting links 92 shown in FIG. 5 are designed to pull on a slow in turn link arm 96 whether vehicle 4 is turning to the right or the left. Note that in a turn, the front end of slow in turn link arm 96 gets moved forwardly on vehicle 4 (to the right in FIG. 7) regardless of the direction of the turn. Compare FIG. 7 to FIG. 5. The front end of slow in turn link arm 96 is moved forwardly on vehicle 4 (to the right in FIG. 7) in either a right turn or a left turn of vehicle 4.

Slow in turn link arm 96 is connected to a slow in turn bellcrank 98 that pivots about a substantially horizontal pivot axis 100. The rear arm of slow in turn bellcrank 98 has an arcuate slot 102 that receives a pin 104 carried on the lower end of slide 46. Preferably, pin 104 is formed by a bushing having ball bearings to smoothly roll against the edges of slot 102, though this is not necessary. The interconnection of pin 104 with arcuate slot 102 is what lifts slide 46 during a vehicle turn.

When the operator uses steering wheel 16 to turn vehicle 4, whether to the left or right, connecting links 92 shown in FIG. 5 pull link arm 96 forwardly as represented by the arrow D in FIGS. 6B and 7. This in turn rotates slow in turn bellcrank 98 in a clockwise direction about its pivot axis 100 as represented by the arrow E. This causes the rear arm of slow in turn bellcrank 98 that is engaged with slide 46 to rise, thereby forcing the entire slide upwardly. Compare FIG. 4 where no rise of slide 46 has occurred to FIG. 6 where some rise has occurred due to a turn of vehicle 4. In fact, the FIG. 6 orientation represents slide 46 having been vertically raised the maximum amount since cam plate pivot axis 44 and upper pin 52 have moved from one end to the other of vertical slots 50 in slide 46.

The amount slide 46 is raised is proportionate to the amount steering wheel 16 is turned. Preferably, the parts are configured so that slide 46 is raised to its maximum extent when vehicle 4 is in a maximum turn. In lesser turns, slide 46 will still be raised proportionately, but cam plate pivot axis 44 and upper pin 52 will not reach the lower end of the vertical slots 50 as they will in a maximum turn.

Figure 8:
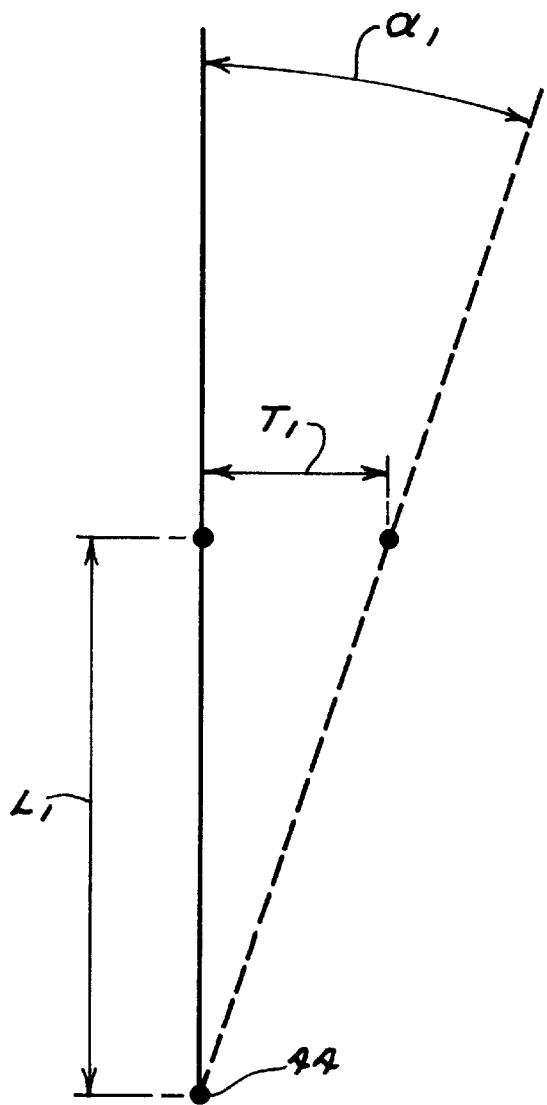
FIG. 8 is a diagrammatic view (not to scale) of the operation of the slow in turn system of this invention when the vehicle is travelling straight, showing a particular angle of rotation produced by a given translation of the accelerator linkage.

The effect of lifting slide 46 is to change the length of the moment arm between cam plate pivot axis 44 and the point of connection of rear accelerator link arm 38. Referring to FIG. 8, when vehicle 4 is traveling straight without turning, slide 46 is in its lowermost position on cam plate 42. In this orientation of slide 46, the moment arm has a length diagrammatically shown as $L_1$ in FIG. 8. Thus, when the operator depresses foot pedal 24 a desired amount to cause rear accelerator link arm 38 to move forwardly a predetermined amount diagrammatically indicated as $T_1$, cam plate 42 will have a predetermined amount of rotation diagrammatically indicated as $\alpha_1$ in FIG. 8.

Figure 9:
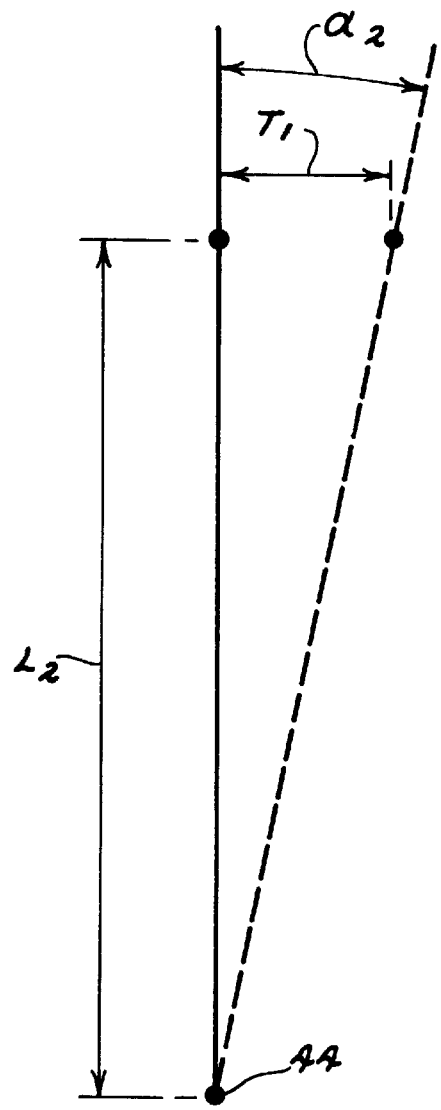
FIG. 9 is similar to FIG. 8 and is a diagrammatic view (not to scale) of the operation of the slow in turn system of this invention when the vehicle is turning, showing the smaller angle of rotation, resulting from a lengthened moment arm, which is now produced by the same amount of translation of the accelerator linkage as shown in FIG. 8.

Notice what happens when vehicle 4 turns and slide 46 moves upwardly. The length of the moment arm of rear accelerator link arm 38 now increases from $L_1$ to $L_2$. See FIG. 9 which depicts the lengthening of the moment arm. Thus, for an identical amount of forward translation $T_1$ of rear accelerator link arm 38, one gets a smaller amount of rotation $\alpha_2$ for cam plate 42. Effectively, cam plate 42 is rotated reversely to pivot input lever 20 of speed changing system 18 rearwardly, thereby reducing the vehicle speed. This happens automatically as slide 46 rises simply by virtue of the geometry of the parts and the consequent lengthening of the moment arm between cam plate pivot axis 44 and the point of attachment of rear accelerator link arm 38. Slide 46 simply forms a slidable connection point between cam plate 42 and rear accelerator link arm 38.

Slow in turn system 2 of this invention has been described as using bellcrank 98 to lift or raise slide 46 during a vehicle turn. However, system 2 is geometrically configured so that slide 46 would normally lift on its own accord due to the forward pull from the accelerator linkage as the operator depresses foot pedal 24. Thus, bellcrank 98 normally prevents or blocks slide 46 from moving up when vehicle 4 is travelling straight, but permits slide 46 to rise when vehicle 4 is turning. In any case, whether the parts are configured such that bellcrank 98 physically lifts slide 46 during a turn, or permits slide 46 to rise during a turn from some other force such as that provided by accelerator linkage pull, is irrelevant to this invention. The important point is that slide 46 is vertically movable relative to cam plate pivot axis 44 and does in fact move away therefrom during a vehicle turn to change the system geometry as described earlier.

As slide 46 rises during a vehicle turn, the connection point between slide 46 and rear accelerator link arm 38 will also move up. Compare FIG. 4A with FIG. 6A. The components of slow in turn system 2 of this invention are configured so that this motion of the connection point of rear accelerator link arm 38 to slide 46 will lie on the circle whose origin is the front connection point where rear accelerator link arm 38 connects to second link 40 of intermediate link assembly 34. Since the front connection point of rear accelerator link arm 38 to intermediate link assembly 34 is pivotal, all that happens to accelerator linkage 28 during a vehicle turn is that rear accelerator link arm 38 pivots in a clockwise direction about the front connection point while cam plate 42 and slide 46 move rearwardly. Intermediate link assembly 34 and front accelerator link arm 30, along with cruise control link arm 80, remain absolutely stationary for a given position of foot pedal 24.

As a result, slow in turn system 2 of this invention operates to automatically slow vehicle 4 during turns without affecting the position of foot pedal 24 or cruise control system 78. Using the example noted above, for a given depression of foot pedal 24 and for a corresponding given amount of forward translation of accelerator linkage 28, i.e. for a given amount of $T_1$, the rise in slide 46 will slow vehicle 4 by rotating slide 46 and cam plate 42 reversely about cam plate pivot axis 44 without in any way affecting the position of either foot pedal 24 or cruise control system 78 if it is engaged. Thus, vehicle 4 slows, but foot pedal 24 is not forced back against the operator's foot as in prior systems and cruise control system 78 does not disengage or need not be disengaged.

The advantages of this are apparent. Slow in turn system 2 of this invention operates without forcing foot pedal 24 back. This avoids distracting the operator. Moreover, this is done with a mechanical linkage system that is durable, simple and operates reliably. Slow in turn system 2 operates without electrical power or sensors of any type and depends just on the mechanical geometry of its parts. It works without any conscious operator intervention.

One tendency an operator might have in a vehicle equipped with this slow in turn system is to push down on foot pedal 24 harder as vehicle 4 slows in a turn to attempt to keep the pedal pressure sensed by the operator against his or her foot constant. If additional forward movement of pedal 24 were permitted during a turn from the pedal position occurring before the turn began, then the operator could manually accelerate vehicle 4 to override the action of the slow in turn system 2. This is permitted by system 2 in certain situations but not in other situations.

Consider that a vehicle 4 of this type desirably has a maximum straight ahead speed. In this case, vehicle 4 preferably has a maximum straight ahead speed of 7 miles per hour (mph) or so. However, at any given time, vehicle 4 might be travelling straight at speeds, e.g. 2 or 3 mph, much less than the maximum straight ahead speed. In fact, because of the infinitely variable speed permitted by the transmission, the operator might select any straight ahead speed in the range of 0 to the maximum permitted speed, i.e. anywhere from 0 to 7 mph in the example used above.

A particular straight ahead speed is selected, of course, by depressing and holding foot pedal 24 at a particular position. This, in turn, is done by most operators by sensing the pressure of the pedal against his or her foot when the pedal is in the desired position. The operator then tries to keep this pressure constant so as to maintain a constant position of the foot pedal.

If the operator has selected a position for foot pedal 24 that sets a relatively slow straight ahead speed, say 3 mph, and then initiates a turn, slow in turn system 2 will automatically reduce the already slow speed of vehicle 4. This can be a disadvantage in certain operational situations. For example, if the operator is driving vehicle 4 slowly up a hill and then turns vehicle 4 while climbing, the reduction in speed brought about by slow in turn system 2 could be sufficient to cause vehicle 4 to stop. In this situation, it is desirable to allow the operator to press further down on foot pedal 24 to at least overcome the speed reduction caused by slow in turn system 2 to thereby continue the slow speed ascent of vehicle 4 up the hill. Moreover, since many of the problems overcome by system 2, such as preventing turf scuffing, are not as prevalent at low speeds of vehicle 4, allowing operator 2 to manually override the effect of system 2 during turns at lower speeds is permissible. Accordingly, slow in turn system 2 is designed to do precisely that, i.e. operator 2 may push down further on foot pedal 24 during low speed turns of vehicle 4 to manually accelerate vehicle 2 out of the even lower speed that would otherwise have been provided by the action of slow in turn system 2.

However, the same rationale does not apply to operation of system 2 during turns at higher vehicle speeds close to the maximum speed of vehicle 4. In such a situation, turf scuffing is much more likely to occur. Thus, allowing the operator to override the speed reduction provided by slow in turn system 2 is not desirable at higher vehicle speeds.

Accordingly, in this system 2, rear accelerator link arm 38 connects to intermediate link assembly 34 at the front connection point using a bolt or pin 106 that faces a rearwardly facing abutment. Conveniently, this abutment is formed by a rearwardly facing surface 108 on brake bellcrank 56. This surface 108 is deliberately shaped to abut against bolt or pin 106 at certain times to prevent the operator from achieving any additional forward depression of foot pedal 24.

The interaction between bolt or pin 106 and surface 108 can best be explained by referring to FIGS. 4B and 6B. In FIG. 4B, the vehicle is traveling straight at its maximum straight ahead speed, preferably 7 mph, and pin 106 abuts against surface 108. If the operator initiates any type of turn up to the maximum turn shown in FIG. 6B, a progressive speed reduction occurs from 7 mph to the speed permitted during a maximum turn (i.e. a turn in which steering wheel 16 is full over) which is desirably about 4 mph. In these turning situations after initially travelling straight at the maximum straight ahead speed, pin 106 remains in abutting engagement with surface 108 to prevent the operator from further accelerating vehicle 4.

However, at straight ahead speeds lower than the maximum straight ahead speed, there is normally some distance between pin 106 and surface 108 which distance varies with the straight ahead speed of vehicle 4. The lower the straight ahead speed at which vehicle 4 is travelling, the greater the distance between pin 106 and surface 108. Thus, in these conditions, during a turn, the operator can still push down on foot pedal 24 to advance the accelerator linkage at least until the pin 106 engages against surface 108. Thus, during turns at lower straight ahead speeds, the operator can accelerate vehicle 4 up to the speed that would have been permitted during a turn of similar angle while at the maximum straight ahead speed, whatever that speed might be. This assumes, of course, that the cruise control system is either off or is set sufficiently high so that pin 106 engages against surface 108 before the front end of cruise control link arm 80 engages the rear side of slot 82.

For example, when travelling at the maximum straight ahead speed of 7 mph as shown in FIG. 4B, if the operator initiates a maximum turn as shown in FIG. 6B, the speed provided by system 2 drops to 4 mph as described earlier. However, If the vehicle had initially been travelling at a straight ahead speed of only 3 mph instead of 7 mph, there would have been some distance between the pin 106 and surface 108. Thus, if the operator had then initiated a maximum turn, the operator could have, if he or she had so desired, simply pushed down on foot pedal 24 to keep the vehicle speed at or around 3 mph. This foot pedal depression would have brought pin 106 closer to surface 108, but there would still have been some distance between the two as long as only 3 mph was maintained by the operator. In fact, if the operator had so desired, the operator could have pushed down on foot pedal 24 to accelerate the vehicle past 3 mph all the way back to 4 mph (the speed of vehicle 4 in a maximum turn when initially travelling at the maximum straight ahead speed) at which point the pin 106 would have reengaged the surface 108. Thus, pin 106, which simply forms a convenient stop or tab on accelerator linkage 28, and its engagement with surface 108 prevents any acceleration of the vehicle past 4 mph in a maximum turn regardless of the initial straight ahead speed of vehicle 4.

Various modifications of this invention will be apparent to those skilled in the art. For example, accelerator linkage 28 is split into two link arms, namely front accelerator link arm 30 and rear accelerator link arm 38, primarily for two reasons. First, it is easier to link foot pedal 24 to cam plate 42 using two separate link arms in the crowded confines of slow in turn system 2 given where the other components are placed. Secondly, the rear connection point of rear link arm 38 has to move on the circle whose origin is the front connection point of the link arm 38 during turns of vehicle 4 if the operation of slow in turn system 2 is to avoid moving foot pedal 24 rearwardly. This is easier to accomplish with a shorter second link arm 38 rather than with a longer single link arm. However, having said the above, it would be possible to use only a single link arm to connect foot pedal 24 to slide 46 on cam plate 42 in place of the two link arms 30 and 38 that are shown.

Moreover, the connection point between the rear link arm and cam plate 42 could be something other than the vertically movable slide 46. For example, slide 46 could be dispensed with and a vertical slot could be placed in cam plate 42 extending away from cam plate pivot axis 44. The connection point of rear link arm 38 could then be placed within this slot so that the rear connection point of rear link arm 38 would slide up and down in this slot in cam plate 42. The rear arm of slow in turn bellcrank 98 lever would then somehow engage against the rear link arm to move it upwardly in the slot as vehicle 4 turns.

It would also be possible to connect slider 46 directly to the speed control lever 20 of the transmission without using a separate cam plate 42. Cam plate 42 is useful with some transmissions which are too sensitive to direct motion of speed control lever 20 with cam plate 42 dampening or reducing the affect that motion of slider 46 has on speed control lever 20. However, this dampening aspect of cam plate 42 may not be needed with other transmissions, and thus cam plate 42 could be dispensed with in such transmissions.

Slow in turn system 2 of this invention is configured so that vehicle 4 slows in all turns with the amount of the slowing being proportionate to the amount steering wheel 16 is turned. During a slight turn of steering wheel 16, vehicle 4 slows only a little from its preset speed. During a maximum turn of steering wheel 16, vehicle 4 slows more.

However, it would be possible to have a slow in turn system in which the amount of slowing was not proportionate to the amount of the turn or where turns in certain ranges would not slow vehicle 4 at all. For example, some type of lost motion connection could be used between the steering system and the connecting links 92 so that slight turns in either direction would not slow vehicle 4 at all. Slow in turn system 2 would begin to operate only when vehicle 4 is turned more than a certain number of degrees in either direction.

Accordingly, because of the many variations of this invention which will be apparent to those skilled in the art, this invention is to be limited only by the appended claims.

We claim:

1. A vehicle, comprising:
   (a) a movable frame on which an operator may be carried, the frame having a plurality of ground engaging wheels comprising a pair of drive wheels and at least one steerable wheel;
   (b) a steering system coupled to the at least one steerable wheel for changing the direction of movement of the frame to thereby turn the frame;
   (c) a speed changing system for changing the speed of movement of the frame, wherein the speed changing system comprises a single variable speed transmission coupled to the drive wheels;
   (d) an accelerator operatively linked to the transmission which accelerator can be engaged and moved by the operator to set a desired speed of movement of the frame; and
   (e) a slow in turn linkage extending between the steering system and the transmission for automatically slowing the frame during at least some turns of the frame without affecting the position of the accelerator.

2. The vehicle of claim 1, wherein the accelerator comprises a foot pedal that may be selectively operated by the operator.

3. The vehicle of claim 2, wherein the accelerator is linked to the transmission by an accelerator linkage, and wherein the means for slowing is operatively coupled to at least some portion of the accelerator linkage.

4. The vehicle of claim 3, wherein the accelerator linkage comprises at least one link arm extending between the foot pedal and the transmission, wherein the link arm is moved in a longitudinal direction when the foot pedal is operated by the operator, and wherein the slow in turn linkage is operable without longitudinally moving the at least one link arm to allow the foot pedal to remain stationary during operation of the slow in turn linkage.

5. The vehicle of claim 3, wherein the accelerator linkage includes a pivotal cam plate that is operatively coupled to an input lever of the transmission to rotate the input lever upon rotation of the cam plate to thereby change the speed provided by the transmission and wherein the accelerator linkage includes one link arm that is connected to the pivotal cam plate.

6. The vehicle of claim 5, wherein the one link arm is movably connected to the pivotal cam plate to selectively change the moment arm of the one link arm relative to a pivot axis of the pivotal cam plate, and further including means for moving the link arm away from the pivot axis of the pivotal cam plate during turns of the frame to slow the frame during turns.

7. The vehicle of claim 1, further including a cruise control system for selectively maintaining a set speed of movement.

8. The vehicle of claim 7, wherein the slow in turn linkage is operable without releasing or requiring release of the cruise control system.

9. A vehicle, comprising:
   (a) a movable frame on which an operator may be carried;
   (b) a steering system for changing the direction of movement of the frame to thereby turn the frame;
   (c) a speed changing system for changing the speed of movement of the frame, the speed changing system having an input lever that may be rotated to vary the output speed of the speed changing system;
   (d) a pivotal accelerator on the frame which accelerator can be pivoted by the operator to set a desired speed of movement of the frame;
   (e) an accelerator linkage coupling the accelerator to the input lever of the speed changing system, the accelerator linkage including:
      (i) a member pivotal about an axis and operatively connected to the input lever of the speed changing system so that pivoting of the member about the axis rotates the input lever to vary the output speed of the speed changing system;
      (ii) at least one link arm connecting the accelerator to the pivotal member, the connection between the link arm and the pivotal member being movable towards and away from the pivot axis of the pivotal member; and
   (f) means for moving the connection between the link arm and the pivotal member away from the pivot axis of the pivotal member during at least some turns of the frame to thereby automatically slow the frame during turns.

10. The vehicle of claim 9, wherein the connection moving means is operable without affecting the position of the accelerator.

11. A vehicle, comprising:
   (a) a movable frame on which an operator may be carried;
   (b) a steering system for changing the direction of movement of the frame to thereby turn the frame;
   (c) a speed changing system for changing the speed of movement of the frame, the speed changing system having an accelerator that is selectively operable by the operator to select a desired speed;
   (d) a slow in turn system for automatically slowing the frame during at least some turns of the frame without operator action; and
   (e) a cruise control system for selectively maintaining a set speed of movement.

12. The vehicle of claim 11, wherein the slow in turn system is operable without affecting the position of the accelerator.

13. The vehicle of claim 11, wherein the slow in turn system is operable without releasing or requiring release of the cruise control system.

14. The vehicle of claims 11, wherein the slow in turn system is operable without affecting the position of the accelerator and without releasing or requiring release of the cruise control system.

15. The vehicle of claim 11, further including means for permitting the operator to selectively override the slowing effect produced by the slow in turn system.

16. A vehicle, comprising:
   (a) a movable frame on which an operator may be carried;
   (b) a steering system for changing the direction of movement of the frame to thereby turn the frame;
   (c) a speed changing system for changing the speed of movement of the frame, the speed changing system having an accelerator that is selectively operable by the operator to select a desired speed;
   (d) a slow in turn system for automatically slowing the frame during at least some turns of the frame; and
   (e) means for permitting the operator to selectively override the slowing effect produced by the slow in turn system.

17. The vehicle of claim 16, wherein the overriding means permits the opertor to selectively override the slowing effect when the vehicle is initially travelling straight at certain speeds but not when the vehicle is initially travelling straight at other speeds.

18. The vehicle of claim 16, wherein the overriding means permits the opertor to selectively override the slowing effect when the vehicle is initially travelling straight at speeds less than a maximum straight ahead speed but not when the vehicle is initially travelling straight at the maximum straight ahead speed.

19. A vehicle, comprising:
   (a) a movable frame on which an operator may be carried;
   (b) a steering system for changing the direction of movement of the frame to thereby turn the frame;
   (c) a speed changing system for changing the speed of movement of the frame, the speed changing system having an input lever that may be rotated to vary the output speed of the speed changing system;
   (d) a pivotal accelerator on the frame which accelerator can be pivoted by the operator to set a desired speed of movement of the frame;
   (e) an accelerator linkage coupling the accelerator to the input lever of the speed changing system, the accelerator linkage including:
      (i) a member pivotal about an axis and operatively connected to the input lever of the speed changing system so that pivoting of the member about the axis rotates the input lever to vary the output speed of the speed changing system;
      (ii) at least one link arm connecting the accelerator to the pivotal member, the connection between the link arm and the pivotal member being movable towards and away from the pivot axis of the pivotal member; and
   (f) a slow in turn linkage operatively extending between the steering system and the link arm for moving the connection between the link arm and the pivotal member away from the pivot axis of the pivotal member during at least some turns of the frame to thereby automatically slow the frame during turns.

* * * * *